United States Patent

[11] 3,628,254

[72] Inventor William W. Burmeister
Phoenix, Ariz.
[21] Appl. No. 24,576
[22] Filed Apr. 1, 1970
[45] Patented Dec. 21, 1971
[73] Assignee Sperry Rand Corporation

[54] NONPENDULOUS FLUX VALVE COMPASS SYSTEM
14 Claims, 3 Drawing Figs.
[52] U.S. Cl. .................................................... 33/225
[51] Int. Cl. .................................................. G01c 17/38
[50] Field of Search ..................................... 33/225 A, 225 R, 224; 73/1 E

[56] References Cited
UNITED STATES PATENTS

| | | | |
|---|---|---|---|
| 2,168,112 | 8/1939 | Benard .......................... | 33/225 |
| 2,852,859 | 9/1958 | Depp ............................ | 33/225 |
| 3,071,959 | 1/1963 | Depp ............................ | 73/1 |
| 3,133,244 | 5/1964 | Wojtulewicz ................. | 324/43 |
| 3,466,923 | 9/1969 | Corleis et al ................. | 72/467 |

FOREIGN PATENTS

| | | |
|---|---|---|
| 591,019 | 8/1947 | Great Britain ............... |

Primary Examiner—Robert B. Hull
Attorney—S. C. Yeaton

ABSTRACT: A magnetic compass system utilizing a strapped-down, Y-configured flux valve in combination with an orthogonally disposed sensor responsive to magnetic field components oriented normal to the plane of the flux valve windings. Multiplier circuits coupled to the orthogonal sensor modify its output signal in accordance with pitch and roll attitude of the flux valve to produce respective DC compensation signals which are applied to the flux valve output windings in a manner to generate magnetic fields thereabout for cancelling vertical field components aligned with the valve as a consequence of the pitching and rolling motion. The output windings of the flux valve are coupled in conventional fashion to a synchro-type receiver mechanism for driving the compass indicator.

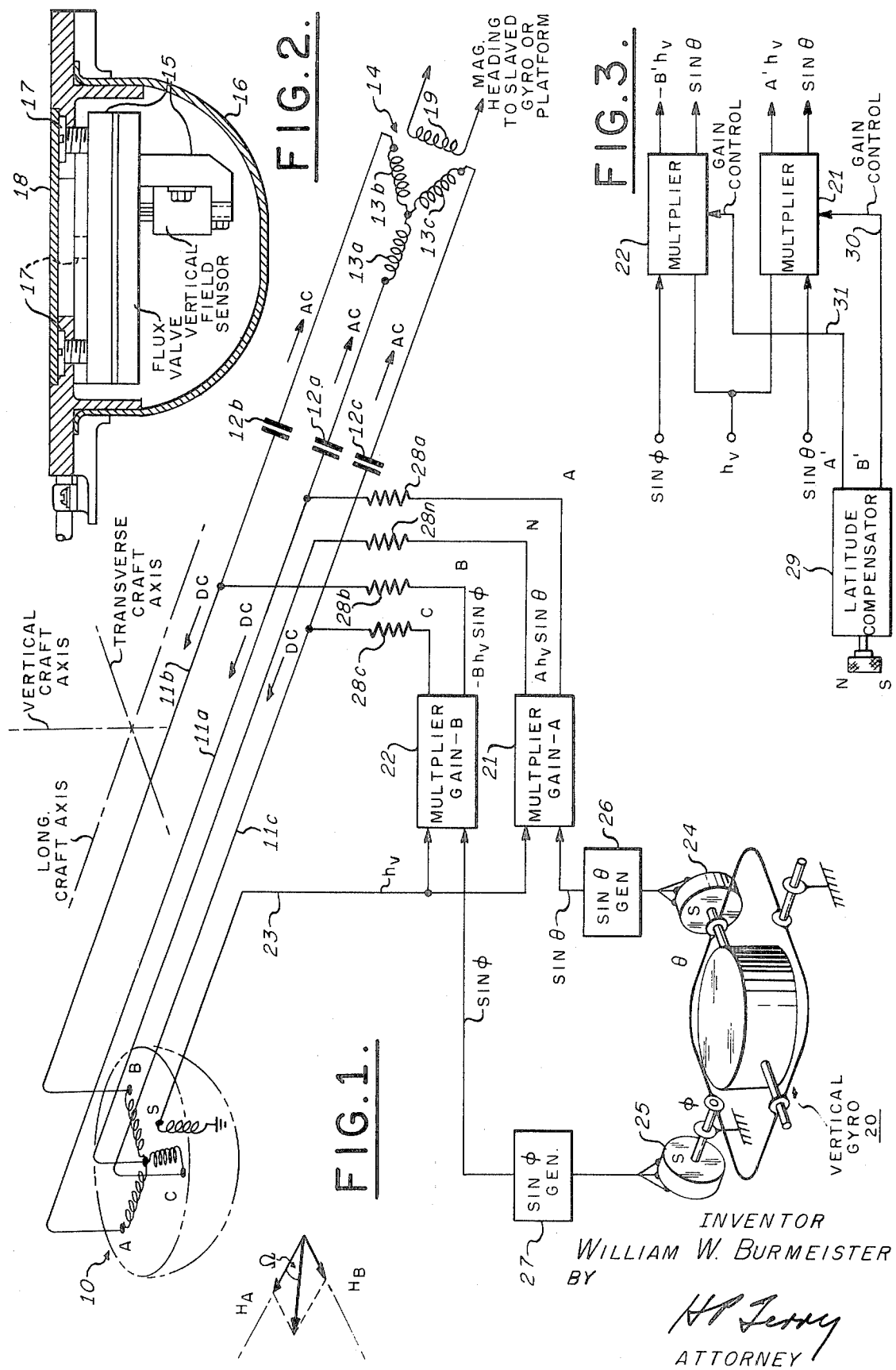

3,628,254

NONPENDULOUS FLUX VALVE COMPASS SYSTEM

BACKGROUND OF THE INVENTION

1. Field of the Invention

The present invention relates to magnetic compass systems of the type incorporating a strapped-down earth's magnetic field sensitive element, such as a flux valve, and more particularly to means for virtually eliminating adverse effects resulting from pitching and rolling of the craft in which the system is installed.

2. Description of the Prior Art

At the present time navigation of craft such as airplanes and ships is conveniently and practically accomplished with apparatus responsive to the earth's magnetic field. To assure accurate navigation, however, only the horizontal component of the earth's field must be sensed and accordingly provision must be made to preclude the introduction of vertical field components into the sensed data. Heretofore this has customarily been accomplished with either gyro-stabilized or pendulously mounted magnetic field detecting equipment. Systems utilizing strapped-down field sensitive elements, however, are also known in the art. One such system is described in U.S. Pat. No. 2,998,727, by D. H. Baker entitled "Heading Reference System for Navigable Craft," issued Sept. 5, 1961. This patent enumerates various disadvantages of gyro-stabilized and pendulous elements, for example cumbersome weight and size, limited temperature range of operation and degraded performance because of considerable susceptibility to shock, vibration and acceleration.

The compass system described in the aforementioned Baker patent includes a flux valve having three mutually perpendicular output windings adapted for mounting in a craft with its respective windings aligned parallel to the longitudinal, transverse and vertical craft axes. In a level condition of the craft, the longitudinal and transverse windings respond to the earth's horizontal field while the vertical winding is responsive to the earth's vertical field. As the craft rolls or pitches, however, the longitudinal and transverse windings sense only a component of the earth's horizontal field in addition to a component of the vertical field. Likewise, the vertical winding does not sense the full vertical field and simultaneously senses a component of the horizontal field. Magnetic heading errors arising from the foregoing conditions are avoided by coupling the vertical and longitudinal flux valve windings to similarly oriented stator windings of a resolver having its rotor pendulously mounted for rotation about the pitch axis of the craft. The resolver rotor winding is normally oriented in a level condition of the craft for maximum coupling with the longitudinal stator winding and zero coupling with the vertical stator winding. The rotor therefore normally has induced in it a voltage representative of the cosine of the heading. As the craft pitches, the magnitude of the voltages coupled to the stator windings changes and the rotor is displaced relative to the stator windings, but the total signal induced in the rotor remains constant at a magnitude corresponding to that of the earth's horizontal field by virtue of the rotor remaining fixed in space by the action of the pendulum. Thus, the rotor voltage remains representative of the cosine of the heading as in the case of a level condition of the craft. Rolling motion of the craft is compensated in a similar manner by coupling the transverse and vertical windings of the flux valve to similarly oriented stator windings having a rotor pendulously supported for rotation about the roll axis of the craft. In this case, the resolver rotor is normally disposed under level conditions for maximum coupling with the transverse winding and zero coupling with the vertical winding. The respective rotor output signals in turn are applied to appropriately oriented stator windings of a synchro-type control transformer mechanism connected to the compass indicator.

In simple terms then it is seen that the apparatus described in the aforementioned Baker patent obviates the necessity for a stabilized or pendulously supported magnetic field sensitive element by combining the operational capabilities of a fixedly mounted flux valve, having three mutually perpendicular windings, with pitch and roll oriented resolver shaving pendulously supported rotors in which vertical field components of the sensed data are effectively cancelled. In other words, the complexity of the flux valve mounting is reduced only by the inclusion of pendulous resolver components which are susceptible to shock, vibration and acceleration effects in the same manner as the pendulous or gyro-stabilized flux valves, although to a considerably lesser degree.

SUMMARY OF THE INVENTION

The present invention is also addressed to strapped-down magnetic compass systems utilizing magnetometer devices such as flux valves. In the interest of improving reliability and reducing the size, weight and cost of the compass system, the portion thereof relating to the flux valve and vertical field compensation components is embodied in solid-state apparatus having no moving parts subject to shock, vibration, acceleration and ordinary mechanical wear.

A preferred embodiment of the invention described herein comprises a standard three-legged flux valve operating in conjunction with a vertical field sensor. The flux valve is fixedly oriented in a craft with the three legs disposed in a horizontal plane for a level condition of the craft, one of the legs, for instance the A leg, preferably being directed parallel to the craft longitudinal axis. The vertical field sensor is coupled to a pair of multipliers which also receive respective signals representative of sine functions of the craft pitch and roll attitude about orthogonal horizontal axes, as provided by sine function generators connected to the output axes of a vertical gyro. v, multiplier output signals are therefore functions of $(h_r, \theta)$ and $h_r, \Phi)$ where $\theta$ and $\Phi$ represent craft pitch and roll attitude, respectively, and $h_r$ is a signal corresponding to the cumulative components of the horizontal and vertical earth's fields measured by the vertical field sensor. Resistive feedback elements couple the multiplier output signals to the flux valve windings to cancel errors caused by rotation of the craft about its longitudinal or transverse axes.

Under level operating conditions the earth's horizontal field is sensed solely in the flux valve windings which are AC coupled to a synchro-type receiver wherein they produce voltages that generate a resultant voltage vector indicative of the craft heading. Likewise, the vertical field sensor is responsive only to the earty's vertical field and since the roll and pitch attitudes are zero the multiplier outputs are also zero so that no signal is fed back to the flux valve windings. On the other hand, when the craft rolls or pitches the flux valve windings move out of the horizontal plane and begin to sense a component of the earth's vertical field while simultaneously sensing less than the full horizontal field. Consequently, errors are introduced into the magnetic heading signal. The apparatus constructed in accordance with the present invention, however, operates to compensate for these errors. More specifically, the DC output signal provided by one of the multipliers is coupled across the A leg of the flux valve to generate a magnetic field which restores the total field thereabout, that is the resultant of the sensed components of the earth's vertical and horizontal field plus the generated field, to a value equal to the magnitude of the earth's horizontal field multiplied by the cosine of the heading angle measured in a horizontal plane. In a similar manner, the other multiplier output is applied across the remaining flux valve legs, the B and C legs, to restore the total magnetic field thereabout to a value equal to the magnitude of the earth's horizontal field multiplied by the sine of the heading angle.

It will be shown in the following description of the preferred embodiments that the aforedescribed technique provides a high degree of heading accuracy at most frequently encountered flight regimes, namely moderate latitudes and pitch and roll trim attitudes up to about ±10°. As a refinement of the system additional signals can be applied to the multipliers to provide latitude correction of the DC compensation signals.

BRIEF DESCRIPTION OF THE DRAWINGS

FIG. 1 is a simplified schematic of a preferred embodiment of the invention.

FIG. 2 is a side elevational view depicting the flux valve and vertical field sensor located in their mounting fixture.

FIG. 3 schematically depicts a circuit arrangement for coupling the latitude correction signals into the DC compensation signals provided in the apparatus of FIG. 1.

DESCRIPTION OF THE PREFERRED EMBODIMENTS

Referring to FIG. 1, apparatus embodying the invention will be described with reference to a navagable craft in which it may be installed, the craft being designated by its three mutually perpendicular longitudinal, transverse and vertical axes. The magnetic field sensitive device 10 includes a vertical field sensor indicated by output winding S and a flux valve indicated by three equinangularly distributed, coplanar output windings A, B and C. For simplicity of illustration and and description, the excitation windings of the magnetic field sensitive device have been omitted from the drawing. Leads 11a, b and c connected respectively to capacitors 12a, b and c couple the individual flux valve output windings to the corresponding stator windings 13a, b and c of control transformer 14. Any conventional flux valve is suitable, or alternatively the valve may be of the type described in U.S. Pat. application Ser. No. 796,349, filed on Feb. 4, 1969 (issued as Pat. No. 3,517,455), in the name of D. J. Kesselring for "Earth's Field-Sensitive Magnetometer For Use In Compass Systems," the latter being preferred because of its capability for reducing permanent magnetization effects in the core members. Irrespective of the valve that is chosen, however, it is essential that it be properly aligned in the craft to assure accuracy of the heading information obtained therefrom.

Momentarily referring to FIG. 2, it is seen that both the vertical field sensor and the flux valve are connected to a unitary base assembly 15 and enclosed in a housing 16 adapted for attachment to a mounting fixture (not shown) rigidly affixed to the craft, preferably at some extremity thereof or other location whereat the permanent magnetic field produced by the craft itself is at or near a minimum value. Leveling screws 17, arranged in a triangular pattern, bear against the top surface of base assembly 15 enabling the field sensitive components to be adjusted for zero pitch and roll, or at least within 0.5 degrees of tilt relative to the craft horizontal axis, prior to placing cover 18 over the top of the housing. The flux valve windings must also be accurately aligned relative to the horizontal (longitudinal and transverse) axes of the craft. Typically, the A winding is directed parallel to the longitudinal axis. Such alignment can be achieved in accordance with known techniques as described in U.S. Pat. No. 2,887,872, in the names of Halpern et al., entitled "A Method Of Measuring and Compensating For Deviation Errors For Earth's Field Responsive Instruments" and U.S. Pat. application Ser. No. 733,927 (issued as Pat. No. 3,573,610) in the name of H. B. Harris, entitled "Opto-Mechanical Alignment Apparatus" filed June 3, 1968.

Returning now to FIG. 1, in operation of the apparatus it is intended that a magnetic heading signal be produced in the rotor 19 of control transformer 14 for application to a slaved platform or gyro which in turn controls a magnetic heading indicator. When the flux valve is level its output windings sense only the earth's horizontal field and as a result the voltages generated therein produce a resultant voltage vector which is indicative of the craft heading relative to the earth's horizontal field. These conditions always prevail for a horizontally stabilized flux valve but in the case of a strapped-down valve as employed in the present invention, it will be readily apparent that any rolling or pitching motion of the craft immediately reduces the portion of the horizontal field sensed by the valve windings while simultaneously introducing a vertical component thereto, and conversely for the vertical field sensor winding S. As a consequence of this action, the accuracy of the heading information is degraded. Compensation for these deleterious effects is provided in the present invention by means of the vertical field sensor operating in conjunction with vertical gyro 20 and electronic multipliers 21 and 22 which provide DC output signals to be fed back to the flux valve windings. These DC feedback signals generate localized magnetic fields in the vicinity of appropriate flux valve windings such that the total field thereabout including the sensed components of the earth's horizontal and vertical fields plus the locally generated field is substantially equal to the earth's horizontal field irrespective of any rolling and pitching motion of the craft. Hence, performance in the manner of a stabilized flux valve is obtained without any moving components in either the flux valve mounting or the resolving circuits. It should be understood, however, that the accuracy of the system will be impaired for large pitch or roll angles; but for the most commonly experienced flight attitude conditions, up to approximately ±10° of pitch or roll, satisfactory performance is obtained. A more detailed description of the feedback compensation technique is provided in the following paragraphs.

The voltage $h_r$ generated in vertical field sensor S is coupled by lead 23 to the inputs of multipliers 21 and 22 wherein it is modified by the vertical gyro pitch and roll output signals derived from signal generators 24 and 25 and applied to the multipliers through respective sine function generators 26 and 27. Consider the simple case where the craft is traveling along a path parallel to the earth's horizontal field. In a level condition of the craft the vertical field sensor signal $h_v$ is representative solely of the earth's vertical field and the pitch and roll angles are both zero. As a result the multiplier outputs are also equal to zero. On the other hand, when the craft pitches about its transverse axis, the flux valve and field sensor windings become skewed with respect to both the horizontal and vertical earth's fields. In addition, since the pitch angle is no longer equal to zero a DC output voltage $Ah_r \sin \theta$ is produced a the output of multiplier 21 for application through resistors 28a and 28n to generate an appropriate localized magnetic field directed parallel to the valve A winding to compensate for the craft pitch attitude. In a similar manner, when the craft rolls about its longitudinal axis a signal $-B\, h_r \sin \Phi$ is produced at the output of multiplier 22 for application through feedback resistors 28 b and 28 c across the flux valve B and C windings to produce a localized transverse magnetic field equal to the vector resultant of the fields generated in the individual B and C windings. Thus in each instance, either for independent pitching or rolling or any combination of such motions, the multiplier output signals function to generate local magnetic fields in the vicinity of the appropriate flux valve windings to combine with the earth's horizontal and vertical field components aligned therewith so as to establish a resultant field equal to the earth's horizontal field.

The following simplified analytical discussion will serve to provide a quantitative understanding of the mode of operation and degree of accuracy which can be realized with this apparatus. As is well known to those skilled in the art, the earth's horizontal $H_H$ and vertical $H_r$ magnetic fields can be resolved into mutually perpendicular components as $$h_L = H_H \cos \psi \cos \theta - H_V \sin \theta \quad (1)$$
$$h_T = H_H(\cos \psi \sin \theta \sin \Phi - \sin \psi \cos \Phi) + H_V \cos \theta \sin \Phi \quad (2)$$
$$H_V = H_H(\cos \psi \sin \theta \cos \Phi + \sin \psi \sin \Phi) + H_V \cos \theta \cos \Phi \quad (3)$$

where $h_L$, $h_T$ and $h_V$ signify the field components parallel to the longitudinal, transverse and vertical axes respectively and $\psi$, $\theta$ and $\Phi$ are the standard symbols for craft heading, pitch and roll. As previously stated, the accuracy of the heading information is dependent on the values of $h_L$ and $h_T$ remaining constant independent of the craft pitch or roll attitude; and this is accomplished by applying a component of the vertical field sensor signal $h_V$ to the longitudinal A winding and transverse B and C windings of the flux valve. Accordingly, the total longitudinal and transverse magnetic fields which are designated hereinafter as $H_A$ and $H_B$, respectively (see FIG. 1) may be represented mathematically as $$H_A = h_L + A\, h_V \sin \theta \quad (4)$$

$$H_B = h_T - B\, h_V \sin \Phi \quad (5)$$

and the measured heading angle $\Omega$ as $$\Omega = \tan^{-1}(-H_B/H_A) \quad (6)$$

It will be readily appreciated that the desired operating condition, namely, insensitivity of the heading information to pitch and roll of the craft will be realized only if $\Omega = \psi$. That this criterion is in fact satisfied by the present invention can be confirmed theoretically by substituting the values of $H_L$, $h_T$ and $h_V$ of equations 1, 2 and 3 into equations 4 and 5 yielding $$H_A = H_H \cos\psi \cos\theta - H_V \sin\theta + A \sin\theta\, H_H(\cos\psi \sin\theta \cos\Phi + \sin\psi\sin\Phi) + A \sin\theta\, H_V \cos\theta \cos\Phi \quad (7)$$

$$H_B = H_H(\cos\psi \sin\theta \sin\Phi - \sin\psi \cos\Phi) + H_V \cos\theta \sin\Phi - B \sin\Phi H_H(\cos\psi \sin\theta \cos\Phi + \sin\psi \sin\Phi) - B \sin\Phi\, H_V \cos\theta \cos\Phi \quad (8)$$

from which $$\mathrm{Tan}\,\Omega = \frac{H_H \sin\psi\,(\cos\phi + B \sin^2\phi) - \cos\psi \sin\theta \sin\phi(1 - B \cos\phi)] - H_v\, \cos\theta \sin\phi[1 - B \cos\phi]}{H_H[\cos\psi(\cos\theta + A \sin^2\theta \cos\phi) + \sin\psi\, A \sin\theta \sin\phi] - H_v \sin\theta\,[1 - A \cos\theta \cos\phi]} \quad (9)$$

Assume that $\theta = \Phi = 10°$, $\psi$ equals $45°$ and $H_V$ equals $10\, H_H$, a condition which prevails in the range of latitudes from $50°$ to $80°$. Further, select values of $A$ and $B$ which eliminate the $H_V$ terms in equation 9, for example, $$A = \frac{1}{0.985}\,2 = 1.03 \quad \text{and} \quad B = \frac{1}{0.985} = 1.015$$

where $0.985 \approx \cos 10°$. Inserting these values in equation 9 and solving provides $$\mathrm{Tan}\,\Omega = \frac{.707(1.016)}{.707(1.016 \pm .0314)}$$

$$\Omega = 44° \text{ and } \Omega = 46°$$

Hence, for the assumed condition of a $45°$ heading ($\psi = 45°$), only a $1°$ heading error results for a simultaneous pitch and roll of $10°$ as compared with a gimbal error of $1.7°$ for a pendulous valve under the same conditions, thus demonstrating the accuracy of a strapped-down system constructed according to the principles of the present invention. The apparatus of FIG. 1 can be modified as indicated in FIG. 3 to provide latitude compensation. Inasmuch as the values of $A$ and $B$ are selected to eliminate the effect of the earth's vertical field at the most commonly occuring long term attitudes it becomes a simple matter to provide gain control signals from latitude compensator 29 on leads 30 and 31 for adjusting the magnitude of the signals provided at the output of multipliers 21 and 22 in accordance with the predetermined values of $H_H$ and $H_V$ at any given latitude.

It should also be noted that the strapped-down magnetic compass systems of FIGS. 1 and 3 are also susceptible to the usual single-cycle (permanent iron) and two-cycle (transmission) errors which can be corrected by standard techniques well known in the art.

While the invention has been described in its preferred embodiments, it is to be understood that the words which have been used are words of description rather than limitation and that changes may be made within the purview of the appended claims without departing from the true scope and spirits of the invention in its broader aspects.

I claim:

1. A heading reference system for navigable craft comprising
   magnetic field sensitive means adapted for strapped-down mounting on said craft, said magnetic field sensitive means including
      first winding means for sensing the earth's horizontal magnetic field and producing a signal representative thereof in a level condition of said craft, and
      second winding means for sensing the earth's vertical magnetic field and producing a signal representative thereof in said level condition,
   means for receiving the signal produced by said second winding means and responsive to an unlevel condition of said craft for providing a compensating signal indicative of said unlevel condition, and
   means for applying said compensating signal to said first winding means to generate a magnetic field thereabout such that the total field sensed by said first winding means remains substantially equal to the earth's horizontal field irrespective of said unlevel condition.

2. The apparatus of claim 1 including adjustable means for leveling said field sensitive means with respect to the longitudinal and transverse axes of said craft.

3. The apparatus of claim 1 including means for adjusting the magnitude of said compensating signal in accordance with the latitude of said craft.

4. The apparatus of claim 1 wherein said first winding means includes a plurality of coplanar windings thereby enabling orthogonal horizontal field components to be sensed.

5. The apparatus of claim 4 wherein said signal responsive means produces an additional compensating signal also indicative of an unlevel condition of said craft, said compensating signal being applied to at least one of said coplanar windings to generate a first DC magnetic field in said first winding means and said additional compensating signal being applied to the remaining coplanar windings to generate another DC magnetic field in said first winding means transverse to said first field.

6. The apparatus of claim 5 wherein said coplanar windings are equiangularly distributed and total three in number, one of said windings being aligned parallel to the longitudinal axis of said craft; and said signal responsive means includes first and second multipliers, said first multiplier being operative to produce said compensating signal proportional to the product of the signal from said second winding means and a signal representative of the rotation of said craft about its transverse axis, and said second multiplier being operative to produce said additional compensating signal proportional to the product of the signal from said second winding means and a signal representative of the rotation of said craft about its longitudinal axis.

7. The apparatus of claim 6 including means for providing said signals representative of rotation of said craft about its longitudinal and transverse axes as respective sine function signals.

8. The apparatus of claim 7 including means for capacitively coupling said coplanar windings to external synchro receiver apparatus.

9. The apparatus of claim 8 including latitude compensation means for applying signals to said multipliers to adjust the gains thereof in accordance with the latitude of said craft.

10. The apparatus of claim 8 in combination with a vertical gyro for providing said signals representative of the rotation of said craft about its longitudinal and transverse axes.

11. Apparatus for determining the direction of a horizontal magnetic field comprising
   a magnetic field sensitive device including
      first winding means normally disposed for sensing said horizontal field and producing a signal proportional thereto, and
      second winding means normally disposed for sensing a vertically oriented magnetic field and producing a signal proportional thereto,
   means for converting the signal from said second winding means to a compensating signal proportional to the rotation of said magnetic field sensitive device relative to a horizontal plane, and
   means for applying said compensating signal to said first winding means in a manner to eliminate the effects therein of a component of said vertically oriented field sensed thereby as a consequence of said rotation.

12. The apparatus of claim 11 wherein said converting means includes means for producing a sine function signal indicative of the rotation of said field sensitive device.

13. A heading reference system for navigable craft comprising magnetic field sensitive means adapted for rigid mounting in a predetermined orientation in said craft, said magnetic field sensitive means including first winding means having a plurality of coplanar windings oriented in a horizontal plane in a level condition of said craft, and second winding means orthogonal to said coplanar windings, means for transforming an AC signal provided by said second winding means into first and second DC signals which are respective functions of the rotation of said craft about orthogonal horizontally disposed axes, and means for applying said DC signals to said plurality of coplanar windings so as to compensate the heading information provided thereby for errors introduced by said rotation.

14. The apparatus of claim 13 wherein said transforming means includes first and second multipliers, said first multiplier providing said first DC signal proportional to the product of said AC signal and a sine function signal representative of the rotation of said craft about one of said orthogonal axes, and said second multiplier providing said second DC signal proportional to the product of said AC signal and a sine function signal representative of the rotation of said craft about the other of said orthogonal axes.

* * * * *